United States Patent
Park (10) Patent No.: US 11,368,824 B2
(45) Date of Patent: Jun. 21, 2022

(54) METHOD AND AN ELECTRONIC DEVICE CONNECTING PLURALITY OF ELECTRONIC DEVICES TO SERVER THROUGH HUB

(71) Applicant: Samsung Electronics Co., Ltd., Gyeonggi-do (KR)

(72) Inventor: Jihyun Park, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/413,091

(22) Filed: May 15, 2019

(65) Prior Publication Data

US 2019/0357023 A1 Nov. 21, 2019

(30) Foreign Application Priority Data

May 15, 2018 (KR) .................. 10-2018-0055324

(51) Int. Cl.
| | |
|---|---|
| *H04L 12/28* | (2006.01) |
| *H04W 4/38* | (2018.01) |
| *H04L 67/306* | (2022.01) |
| *H04L 67/125* | (2022.01) |
| *H04W 4/80* | (2018.01) |
| *H04W 84/18* | (2009.01) |

(Continued)

(52) U.S. Cl.
CPC .......... *H04W 4/38* (2018.02); *G06V 30/2247* (2022.01); *H04J 3/1694* (2013.01); *H04L 67/125* (2013.01); *H04L 67/306* (2013.01); *H04W 4/80* (2018.02); *H04W 84/18* (2013.01)

(58) Field of Classification Search
None
See application file for complete search history.

(56) References Cited

U.S. PATENT DOCUMENTS 8,756,299 B2 6/2014 Kim et al.
9,641,596 B2 5/2017 Unagami et al.
(Continued)

FOREIGN PATENT DOCUMENTS

| KR | 1020140008667 | 1/2014 |
|---|---|---|
| KR | 1020170057487 | 5/2017 |
| KR | 1020170096081 | 8/2017 |

OTHER PUBLICATIONS

International Search Report dated Sep. 4, 2019 issued in counterpart application No. PCT/KR2019/005588, 12 pages.
(Continued)

*Primary Examiner* — Brandon M Renner
(74) *Attorney, Agent, or Firm* — The Farrell Law Firm, P.C.

(57) ABSTRACT

Disclosed is an electronic device that transmits user information for registering a user account in a server, transmits hub identifiable information to the server, using a wireless communication circuit to add the hub identifiable information corresponding to a hub to the user account registered in the server, obtains device identifiable information corresponding to a plurality of Internet of things (IoT) devices, and transmits the device identifiable information to the server to add the device identifiable information to the user account registered in the server, which information is used such that the hub corresponding to the hub identifiable information added to the user account and the plurality of IoT devices are paired with each other.

10 Claims, 6 Drawing Sheets

(51) Int. Cl.
*H04J 3/16* (2006.01)
*G06V 30/224* (2022.01)

(56) References Cited

U.S. PATENT DOCUMENTS

| | | | |
|---|---|---|---|
| 9,900,091 B2 | 2/2018 | Choi et al. | |
| 9,967,343 B2 | 5/2018 | Kim et al. | |
| 10,181,255 B2 | 1/2019 | Garg et al. | |
| 10,248,399 B2 | 4/2019 | Yoon | |
| 10,477,600 B1* | 11/2019 | Willis | H04W 76/11 |
| 10,613,499 B2 | 4/2020 | Zimmerman et al. | |
| 2010/0070618 A1 | 3/2010 | Kim et al. | |
| 2012/0182939 A1* | 7/2012 | Rajan | G16H 40/67 370/328 |
| 2014/0250183 A1 | 9/2014 | Unagami et al. | |
| 2015/0067176 A1* | 3/2015 | Dubois | H04W 4/80 709/227 |
| 2015/0201022 A1 | 7/2015 | Kim et al. | |
| 2015/0281116 A1 | 10/2015 | Ko et al. | |
| 2015/0347114 A1 | 12/2015 | Yoon | |
| 2015/0372754 A1 | 12/2015 | Choi et al. | |
| 2016/0323257 A1* | 11/2016 | Kang | H04W 12/06 |
| 2016/0330182 A1 | 11/2016 | Jeon et al. | |
| 2017/0005820 A1 | 1/2017 | Zimmerman et al. | |
| 2018/0108246 A1 | 4/2018 | Garg et al. | |
| 2018/0199147 A1* | 7/2018 | Arriaga | H04W 4/80 |
| 2018/0316658 A1* | 11/2018 | Bartlett | H04W 12/001 |
| 2020/0344602 A1* | 10/2020 | Li | H04L 67/125 |
| 2021/0141946 A1* | 5/2021 | Lee | G06Q 20/382 |

OTHER PUBLICATIONS

European Search Report dated Mar. 17, 2021 issued in counterpart application No. 19804283.0-1213, 10 pages.

* cited by examiner

METHOD AND AN ELECTRONIC DEVICE CONNECTING PLURALITY OF ELECTRONIC DEVICES TO SERVER THROUGH HUB

CROSS-REFERENCE TO RELATED APPLICATION(S)

This application is based on and claims priority under 35 U.S.C. § 119 to Korean Patent Application No. 10-2018-0055324, filed on May 15, 2018, in the Korean Intellectual Property Office, the disclosure of which is incorporated herein by reference in its entirety.

BACKGROUND

1. Field

The disclosure relates generally to electronic devices, and more particularly, to a method of connecting a plurality of electronic devices to a server through a hub, and an electronic device performing the same.

2. Description of Related Art

With the development of information technology (IT), the Internet of things (IoT) technology (or smart home technology) that connects electronic devices such as household appliances including a television (TV), an air conditioner, or a refrigerator energy consumption devices, such as water, electricity, air conditioning and heating, and security devices, such as a door lock, a surveillance camera, a motion detection sensor, an opening/closing detection sensor, and a siren to a single communication network have appeared. The IoT technology may monitor and control the electronic devices over the single communication network.

A user may control things in the house with simple manipulation of an electronic device, such as a mobile device, through the IoT technology. For example, the user may control a curtain and may adjust the brightness of the lighting, by manipulating the electronic device. Alternatively, the user may also adjust the room temperature by manipulating the electronic device.

As described above, it may be necessary for an operation of connecting each of IoT devices to a server, to build a smart home using the IoT technology. For example, a user may connect the TV to the server, may connect an air conditioner to the server, and then may connect lighting to the server, via an electronic device.

However, as described above, the conventional manner for connecting IoT devices to the server is complex and time-consuming. In addition, as the number of IoT devices for building the smart home increases, the time required to build the smart home may further increase. It is time-consuming and inconvenient for a user to connect each of a plurality of IoT devices to the server. Accordingly, there is a need in the art for a more efficient, convenient, and user-friendly manner of connecting such IoT devices to a server.

SUMMARY

Aspects of the disclosure are to address at least the above-mentioned problems and/or disadvantages and to provide at least the advantages described below. Accordingly, an aspect of the disclosure is to provide an electronic device providing a more efficient and convenient manner of connecting IoT devices to a server.

In accordance with an aspect of the disclosure, an electronic device includes a wireless communication circuit configured to communicate with a server, a memory configured to store instructions, and at least one processor electrically connected to the wireless communication circuit and the memory, wherein the at least one processor executes the stored instructions to transmit, to the server, user information for registering a user account in the server, transmit hub identifiable information to the server, using the wireless communication circuit to add the hub identifiable information corresponding to a hub to the user account registered in the server, obtain device identifiable information corresponding to a plurality of IoT devices, and transmit at least part of the device identifiable information to the server to add the device identifiable information to the user account registered in the server, wherein the at least part of the device identifiable information added to the user account is used such that the hub corresponding to the hub identifiable information added to the user account and the plurality of IoT devices corresponding to the at least part of the device identifiable information are paired with each other.

In accordance with another aspect of the disclosure, a server includes a wireless communication circuit communicating with an external electronic device, a memory storing instructions, and at least one processor electrically connected to the wireless communication circuit, wherein the at least one processor may execute the stored instructions to receive user information from the external electronic device, using the wireless communication circuit, to register a user account based on the received user information, to receive hub identifiable information about a hub from the external electronic device, using the wireless communication circuit to add the hub identifiable information about the hub to the user account, to receive device identifiable information about a plurality of IoT devices from the external electronic device, using the wireless communication circuit to add the device identifiable information about the plurality of IoT devices to the user account, and to transmit the device identifiable information to the hub corresponding to the hub identifiable information added to the user account, wherein the device identifiable information may be used such that the hub and the plurality of IoT devices are paired with each other.

In accordance with another aspect of the disclosure, a smart home system includes a hub, a server and an electronic device communicating with the server and configured to transmit user information to the server such that a user account is registered in the server, to obtain hub identifiable information corresponding to the hub, to transmit the hub identifiable information to the server such that the hub identifiable information is added to the user account, to obtain device identifiable information corresponding to a plurality of IoT devices, and to transmit the device identifiable information to the server such that the device identifiable information is added to the user account, wherein the server is configured to transmit the device identifiable information added to the user account to the hub, and wherein the hub is configured to be paired with the plurality of IoT devices corresponding to the device identifiable information transmitted from the server.

BRIEF DESCRIPTION OF THE DRAWINGS

The above and other aspects, features, and advantages of certain embodiments of the disclosure will be more apparent

DETAILED DESCRIPTION

Hereinafter, embodiments of the disclosure will be described with reference to accompanying drawings. Detailed descriptions of known functions and configurations incorporated here will be omitted for the sake of clarity and conciseness.

The electronic device according to embodiments may be a smart phone, a computer device, a portable multimedia device, a portable medical device, a camera, a wearable device, or a home appliance, but the electronic devices are not limited to those described above.

The terms used herein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to distinguish a corresponding component from another, and do not limit the components in importance or order. It is to be understood that if a first element is referred to, with or without the term "operatively" or "communicatively", as "coupled with," "coupled to," "connected with", or "connected to" a second element, the element may be coupled with the other element wiredly, wirelessly, or via a third element.

Figure 1:
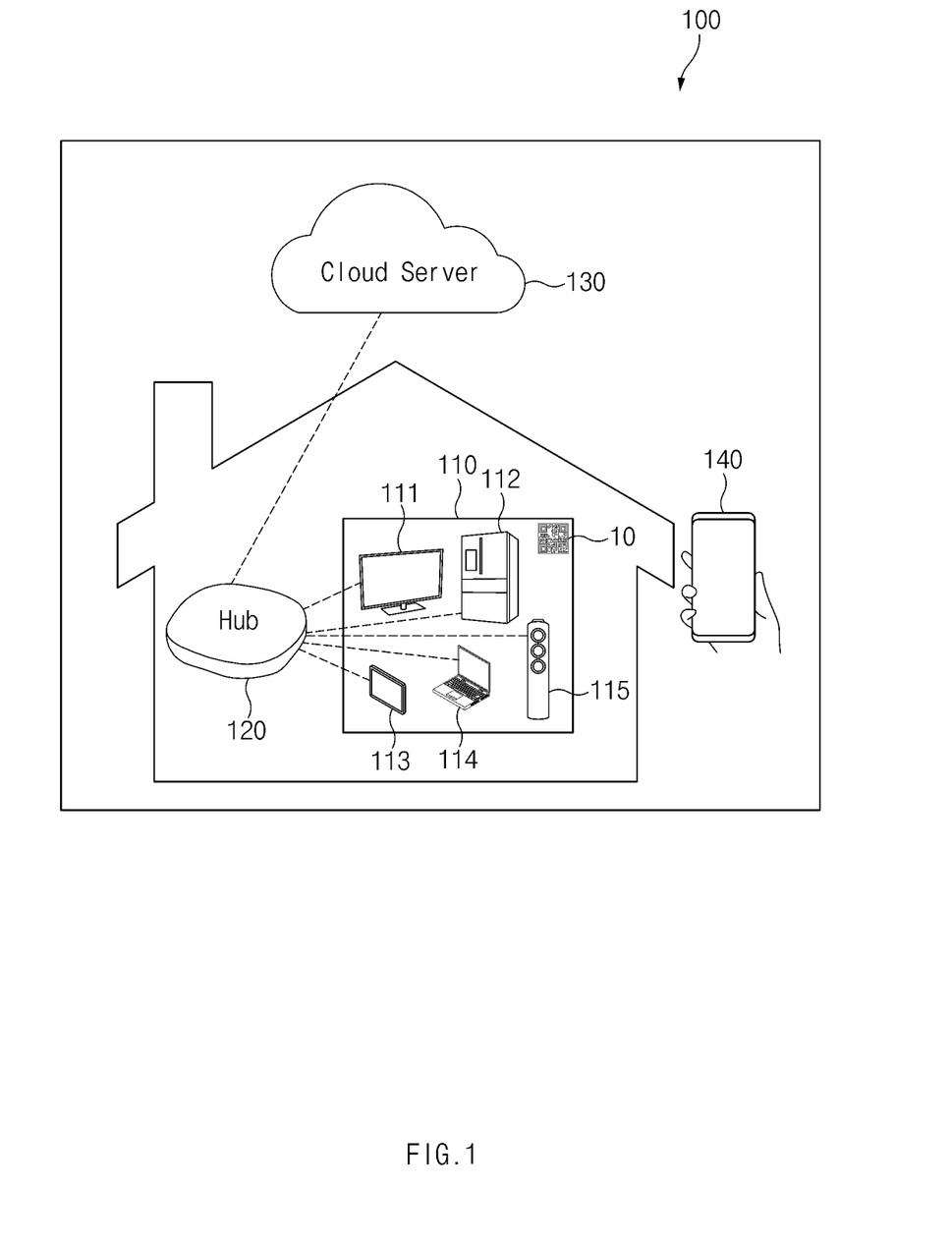
FIG. 1 illustrates a smart home implemented by connecting a plurality of IoT devices to a server through a hub, according to an embodiment.

FIG. 1 illustrates a smart home implemented by connecting a plurality of IoT devices to a server through a hub, according to an embodiment.

Referring to FIG. 1, a smart home 100 may include a plurality of IoT devices 110, a hub 120, a server 130, and an electronic device 140, but are not limited to that illustrated in FIG. 1 and may further include a sub hub that connects the hub 120 to the plurality of IoT devices 110.

The plurality of IoT devices 110 may include a TV 111, a refrigerator 112, a tablet 113, a notebook 114, and/or an air conditioner 115. The plurality of IoT devices 110 may include electronic devices such as a sensor, a washer, an electric heater, a telephone, a door lock, or a surveillance camera, or may include devices that control water, electricity, air conditioning and heating.

The plurality of IoT devices 110 may be connected to the server 130 through the hub 120. Device identifiable information respectively corresponding to the plurality of IoT devices 110 may be transmitted to the server 130 by the electronic device 140. Each of the plurality of IoT devices 110 may be connected to the hub 120 corresponding to hub identifiable information registered in the server 130 after being paired with the hub 120. The plurality of IoT devices 110 may communicate with the server 130 via the connection to the hub 120.

At least one bar code, such as a one-dimensional bar code or a two-dimensional bar code (or QR code) or at least one serial number including the device identifiable information of each IoT device may be attached to each of the plurality of IoT devices 110.

For example, the single bar code or the single serial number may be attached to a package or a box including the plurality of IoT devices 110, and may include device identifiable information about the plurality of IoT devices 110 included in the package or the box. Alternatively, bar codes or serial numbers including device identifiable information may be attached to the plurality of IoT devices 110, respectively.

The hub 120 may relay the connection between the plurality of IoT devices 110 and the server 130, and may perform the function of a router, a bridge, or an access point.

The hub 120 may perform low-power communication with the plurality of IoT devices 110, such as through one of a Bluetooth®, ZigBee®, or wireless highway addressable remote transducer (HART) communication scheme.

The hub 120 may communicate with the server 130 through one of a wireless fidelity (Wi-Fi), Wi-Fi direct, global system for mobile communications (GSM), high-speed downlink packet access (HSDPA), long-term evolution (LTE), LTE advanced (LTE-A), code division multiple access (CDMA), CDMA2000, or wireless broadband (Wi-Bro) communication schemes.

The server 130 may include a processor and a wireless communication circuit. The processor may control overall operations of the server 130. The server 130 may communicate with the hub 120 using the wireless communication circuit or may communicate with the plurality of IoT devices 110 via the hub 120.

The server 130 may register a user account based on user information received through the electronic device 140. The user account may include at least one of the user's name, the user's email address, the user's identifiable information, the registered hub, or the registered IoT devices.

Identifiable information about the hub 120 and the plurality of IoT devices 110, which are used by the user, may be added to the user account. For example, the user may transmit hub identifiable information to the server 130 through the electronic device 140. The hub identifiable information may be added to the account of the user. Alternatively, the user may transmit device identifiable information to the server 130 through the electronic device 140, and the device identifiable information may be added to the account of the user.

The hub 120 corresponding to hub identifiable information and the plurality of IoT devices 110 corresponding to device identifiable information, which are added to one user account are devices capable of being paired with each other. The server 130 may enable the plurality of IoT devices 110 and the hub 120 to be paired with each other, by transmitting the device identifiable information to the hub 120 corresponding to the hub identifiable information.

The electronic device 140 may include a processor and a wireless communication circuit. The processor may control overall operations of the electronic device 140. The electronic device 140 may communicate with the server 130, using the wireless communication circuit. The electronic device 140 may further include a display, a camera, or an input/output module, and may include a configuration that is the same as or similar to the configuration of an electronic device 601 illustrated in FIG. 6.

The electronic device 140 transmits identifiable information such that the plurality of IoT devices 110, the hub 120, and the server 130 communicate with one another. For example, the electronic device 140 may transmit the device identifiable information about the plurality of IoT devices 110 and the hub identifiable information about the hub 120, to the server 130 through a specified application. As such, the server 130 may recognize the plurality of IoT devices 110 and the hub 120 as a target for communication.

The electronic device 140 may obtain the hub identifiable information about the hub 120 and then may transmit the hub identifiable information to the server 130. For example, the electronic device 140 may obtain the hub identifiable information from a user input through an input module and may transmit the hub identifiable information to the server 130, using the wireless communication circuit.

The electronic device 140 may obtain device identifiable information about the plurality of IoT devices 110, at one time or sequentially, through a bar code or a serial number including the device identifiable information.

For example, the electronic device 140 may obtain an image associated with the bar code or the serial number, using a camera and then may obtain the device identifiable information, using the obtained image. Alternatively, the electronic device 140 may obtain a user input associated with the serial number via an input module and may obtain the device identifiable information, using the obtained serial number.

The electronic device 140 may obtain a single bar code or a single serial number including the device identifiable information, and may obtain the device identifiable information using the obtained single bar code or single serial number.

Alternatively, the electronic device 140 may sequentially obtain a single bar code or a single serial number including the single device identifiable information to obtain a plurality of bar codes or a plurality of serial numbers, and may obtain the device identifiable information using the sequentially obtained plurality of bar codes or plurality of serial numbers.

The electronic device 140 may transmit the device identifiable information obtained as described above, to the server 130 by using a wireless communication circuit.

After obtaining identifiable information about at least one device of the plurality of IoT devices 110, the electronic device 140 may register the at least one device in the server 130, and may provide a user with a guide for registering the remaining IoT devices other than the at least one device among the plurality of IoT devices 110, in the server 130. The guide may be based on information, which has been stored in the server 130. The user may register the remaining IoT devices in the server 130 based on the guide displayed in the electronic device 140. The guide may include information about how to apply power to the plurality of IoT devices 110, or information about how the plurality of IoT devices 110 enters a pairing mode.

Figure 2:
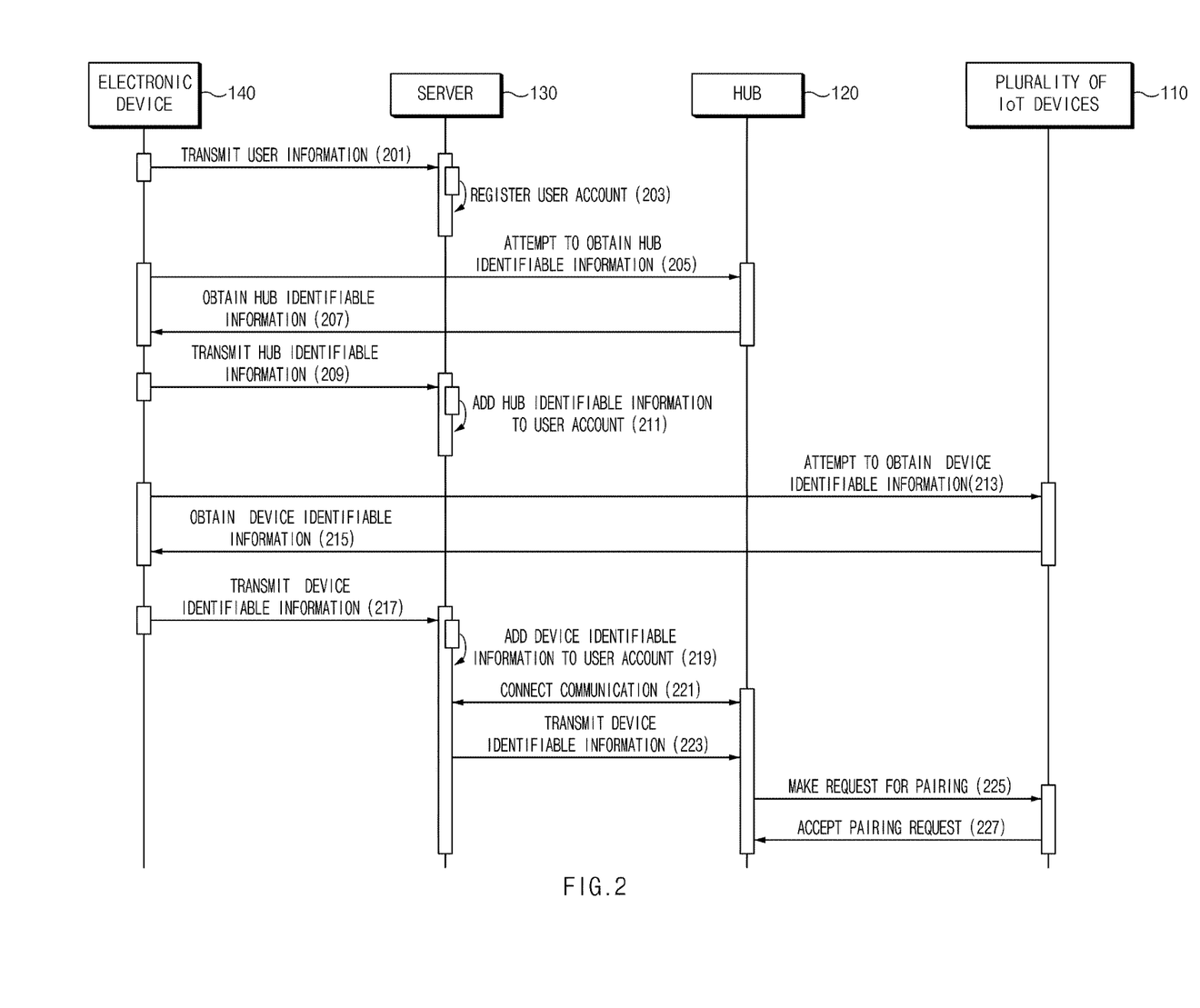
FIG. 2 illustrates an operation of connecting a plurality of IoT devices to a server through a hub, according to an embodiment.

FIG. 2 illustrates an operation of connecting a plurality of IoT devices to a server through a hub, according to an embodiment.

In the following description, the operation of each of the plurality of IoT devices 110, the hub 120, the server 130, and the electronic device 140 is performed by the processor included in each device, and an operation in which data or information is transmitted among the devices is performed by the wireless communication circuit controlled by the processor.

Steps 201 to 227 may not be limited to the order illustrated in FIG. 2. For example, steps 205 to 211 may be simultaneously performed with steps 213 to 219. Alternatively, steps 205 to 211 may be performed after steps 213 to 219 are performed.

In step 201, the electronic device 140 may transmit user information to the server 130. For example, the user information may include identifiable information of the electronic device 140 for registering the user account, or identifiable information of a user.

In step 203, the server 130 may register a user account based on the user information received in step 201. The identifiable information about the electronic device 140 may be added to the user account. When the user account is registered in the server 130, the electronic device 140 may access the server 130 through the user account. Various IoT devices used by the user, such as a TV, a refrigerator, or a computer may be registered in the user account.

In step 205, the electronic device 140 may attempt to obtain hub identifiable information about the hub 120. For example, the electronic device 140 may capture a bar code including the hub identifiable information, through a camera, or may obtain a serial number including the hub identifiable information, through a user input.

In step 207, the electronic device 140 may obtain the hub identifiable information through the image of the bar code or the serial number obtained in step 205.

In step 209, the electronic device 140 may transmit the hub identifiable information obtained in step 207, to the server 130.

In step 211, the server 130 may add the hub identifiable information received from the electronic device 140 to the user account registered in step 203. Because the electronic device 140 is added to the user account, the server 130 may recognize that a hub corresponding to the hub identifiable information added to the user account is a device of the user without a separate authentication procedure. When adding the hub identifiable information to the user account, the server 130 may make a request for a separate authentication procedure to the electronic device 140.

In step 213, the electronic device 140 may attempt to obtain device identifiable information about the plurality of IoT devices 110. For example, the electronic device 140 may capture a bar code including the device identifiable information, through a camera, or may obtain a serial number including the device identifiable information, through a user input.

At least a piece of device identifiable information may be included in the bar code or the serial number. The electronic device 140 may attempt to obtain the device identifiable information, by capturing at least one bar code in one instance or in several instances or by obtaining at least one serial number.

In step 215, the electronic device 140 may obtain device identifiable information through the image of the bar code or the serial number obtained in step 213. Because the image of the bar code or the serial number includes at least one device identifiable information, the user may easily obtain device identifiable information through the image of the bar code or the serial number in a simplified procedure.

In step 217, the electronic device 140 may transmit the device identifiable information obtained in step 215, to the server 130, in one instance or in several instances.

The electronic device 140 may transmit only the part of the obtained device identifiable information, to the server 130. For example, the electronic device may output a specified message for displaying the obtained device identifiable information, on a display, and may obtain a user input and may select a part of the device identifiable information based on the obtained user input.

In step 219, the server 130 may add the device identifiable information received from the electronic device 140 to the user account registered in step 203. Because the electronic device 140 is added to the user account, the server 130 may recognize that the plurality of IoT devices 110, the device identifiable information of each of which is received through the electronic device 140, are devices of the user without a separate authentication procedure. When adding the device identifiable information to the user account, the server 130 may make a request for a separate authentication procedure to the electronic device 140.

In step 221, the server 130 and the hub 120 may be electrically connected to each other. Because the hub identifiable information is added to the user account registered in the server 130 in step 211, the server 130 may recognize the hub 120 as the authenticated device and may communicate with the hub 120. The server 130 and the hub 120 may transmit specified data or the specified signal to each other through a wireless communication circuit of each other.

In step 223, the server 130 may transmit the device identifiable information added to the user account, to the hub 120. Because a plurality of IoT devices corresponding to the device identifiable information correspond to the authenticated devices added to the user account, the IoT devices may be allowed to connect to the hub 120.

In step 225, the hub 120 may make a request for pairing to a plurality of IoT devices corresponding to device identifiable information received from the server 130. Because the plurality of IoT devices 110 are devices added to the user account, the hub 120 may make a request for pairing, without a separate authentication procedure.

In step 227, the plurality of IoT devices 110 may accept the pairing in response to the request for the pairing of the hub 120 performed in step 225. The plurality of IoT devices 110 may communicate with the hub 120 and may communicate with the server 130 through the hub 120.

Figure 3:
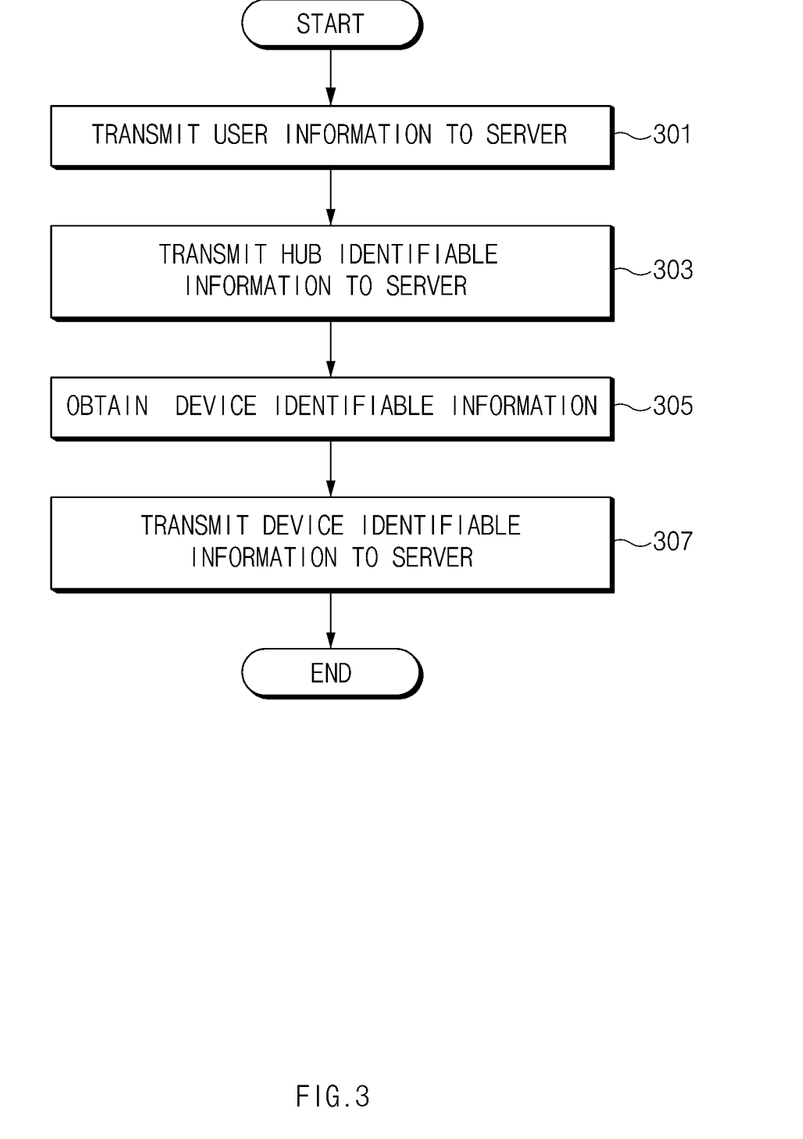
FIG. 3 illustrates an operation in which an electronic device connects a plurality of IoT devices to a server, according to an embodiment.

FIG. 3 illustrates an operation in which an electronic device connects a plurality of IoT devices to a server, according to an embodiment.

In step 301, the electronic device 140 may transmit user information to the server 130. The user information may be information for the server 130 to register a user account. For example, the user information may include identifiable information, such as a device serial number of the electronic device 140 or identifiable information, such as an ID, a password, or a name of the user.

In step 303, the electronic device 140 may transmit hub identifiable information to the server 130, such as the serial number, manufacture number, model name, or ID of the hub 120.

The hub identifiable information may be obtained through the bar code or the serial number attached to the hub 120. For example, the electronic device 140 may obtain an image associated with the bar code or the serial number, through a camera. The processor included in the electronic device 140 may analyze the image to obtain hub identifiable information. Alternatively, the electronic device 140 may obtain the serial number through a user input and then may obtain the hub identifiable information through the serial number.

The hub identifiable information may be added to the user account registered in the server 130. The hub 120 corresponding to the hub identifiable information is authenticated as the user's device when the hub identifiable information is added to the user account.

In step 305, the electronic device 140 may obtain device identifiable information, which may include the serial number of the IoT device, the type of the IoT device, or the model name of the IoT device.

The device identifiable information may be obtained through the bar code or the serial number attached to a plurality of IoT devices. For example, the electronic device 140 may obtain an image associated with a single bar code or a single serial number including device identifiable information, through a camera. The processor included in the electronic device 140 may analyze the image to obtain device identifiable information. Alternatively, the electronic device 140 may obtain the serial number through a user input and then may obtain the device identifiable information through the serial number.

Alternatively, the electronic device 140 may obtain the device identifiable information through a plurality of bar codes or a plurality of serial numbers. For example, the electronic device 140 may obtain first device identifiable information through the bar code or the serial number attached to a single IoT device, may obtain second device identifiable information through another bar code or another serial number attached to another IoT device, and may sequentially obtain device identifiable information through the procedure.

In step 307, the electronic device 140 may transmit the device identifiable information obtained in step 305, to the server 130. The device identifiable information may be added to the user account registered in the server 130. It may be understood that IoT devices corresponding to the device identifiable information are authenticated as the user's device when the device identifiable information is added to the user account.

When both the hub identifiable information and the device identifiable information are transmitted from the electronic device 140 to the server 130, the server 130 may be electrically connected to the hub 120 and may be electrically connected to the plurality of IoT devices 110 through the hub 120.

Figure 4:
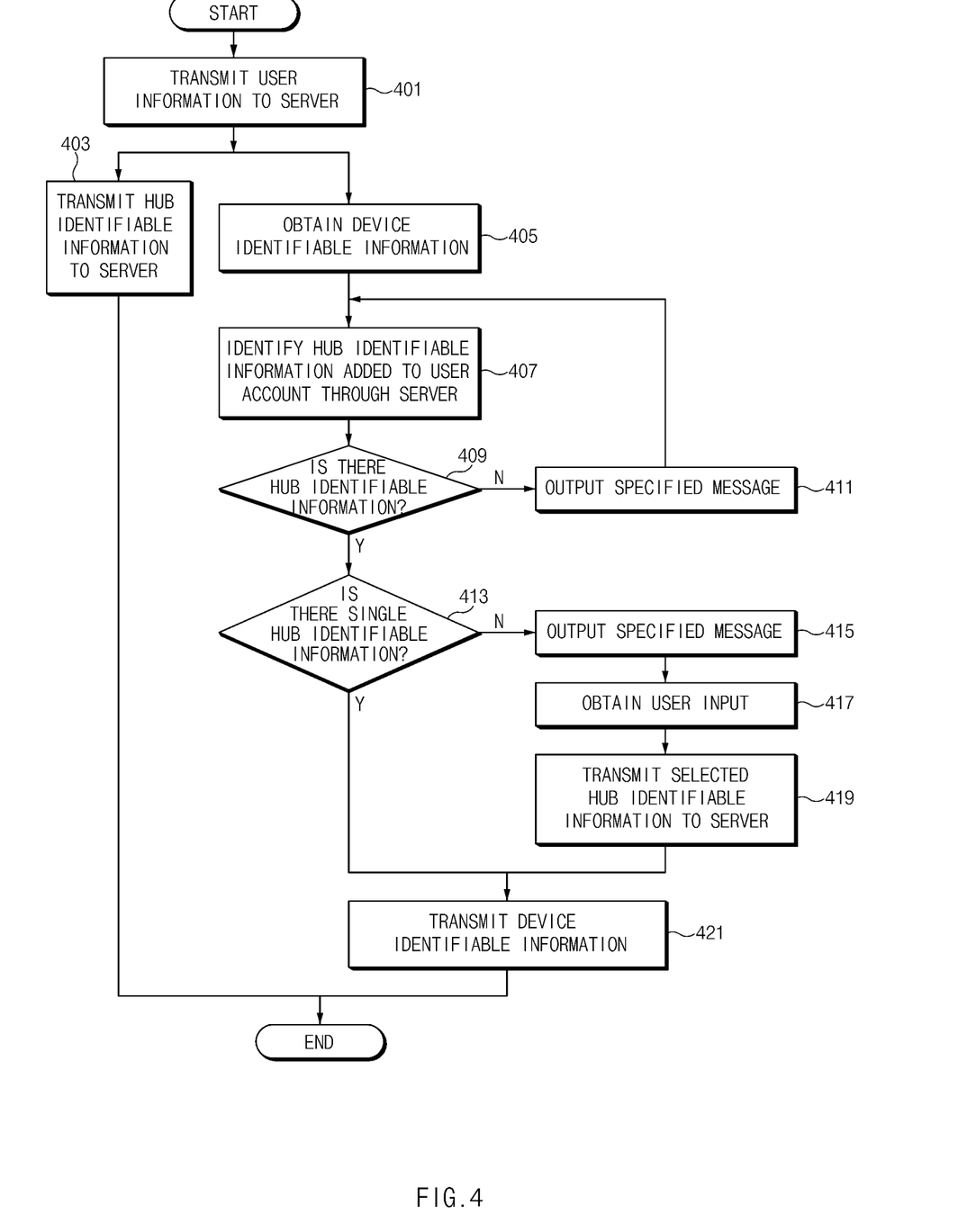
FIG. 4 illustrates an operation in which an electronic device connects a plurality of IoT devices to a server, according to another embodiment.

FIG. 4 illustrates an operation in which an electronic device connects a plurality of IoT devices to a server, according to another embodiment.

Referring to FIG. 4, steps 401 to 405 may be the same as or similar to steps 301 to 305 illustrated in FIG. 3. For example, in steps 401 to 405, the electronic device 140 may transmit user information for registering a user account and hub identifiable information about the hub 120, to the server 130 and may obtain device identifiable information.

In step 407, the electronic device 140 may identify hub identifiable information added to the user account, through the server 130.

In step 409, the electronic device 140 may determine whether the result in step 407 indicates that there is hub identifiable information added to the user account. When there is no hub identifiable information added to the user account, the electronic device 140 may perform step 411.

When determining that the hub identifiable information is added to the user account, the electronic device 140 may perform step 413.

In step 411, the electronic device 140 may output a specified message for transmitting the hub identifiable information to the server 130, on a display. For example, when there is no registered hub identifiable information, the electronic device 140 may output a specified message or a pop-up window for requesting a user to install the hub 120 or to transmit hub identifiable information, on the display.

In step 413, the electronic device 140 may determine whether the result in step 407 indicates that there is hub identifiable information added to the user account and indicating one hub. When hub identifiable information added to the user account indicates a plurality of hubs, the electronic device 140 may perform step 415. When there is one piece of hub identifiable information added to the user account, the electronic device 140 may perform step 421.

In step 415, the electronic device 140 may output a specified message to the display such that the user selects hub identifiable information, which corresponds to the hub 120 to be connected to an IoT device, from among hub identifiable information. For example, the electronic device 140 may output the identified hub identifiable information, to the display and may output a specified message or a pop-up window for making a request for the selection of the user.

In step 417, the electronic device 140 may obtain a user input corresponding to the specified message output in step 415. For example, the electronic device 140 may obtain the user input to select one of the hub identifiable information.

In step 419, the electronic device 140 may transmit hub identifiable information, which is selected by the user, from among hub identifiable information to the server 130.

In step 421, the electronic device 140 may transmit the device identifiable information obtained in step 405, to the server 130. The device identifiable information may be added to the user account registered in the server 130. IoT devices corresponding to the device identifiable information are authenticated as the user's device when the device identifiable information is added to the user account.

Steps 403 and 405 to step 421 may be performed simultaneously, or any one of steps 403 and 405 to step 421 may be performed first. When both the hub identifiable information and the device identifiable information are transmitted from the electronic device 140 to the server 130, the server 130 may be electrically connected to the single hub 120 and may be electrically connected to the plurality of IoT devices 110 through the hub 120.

Figure 5:
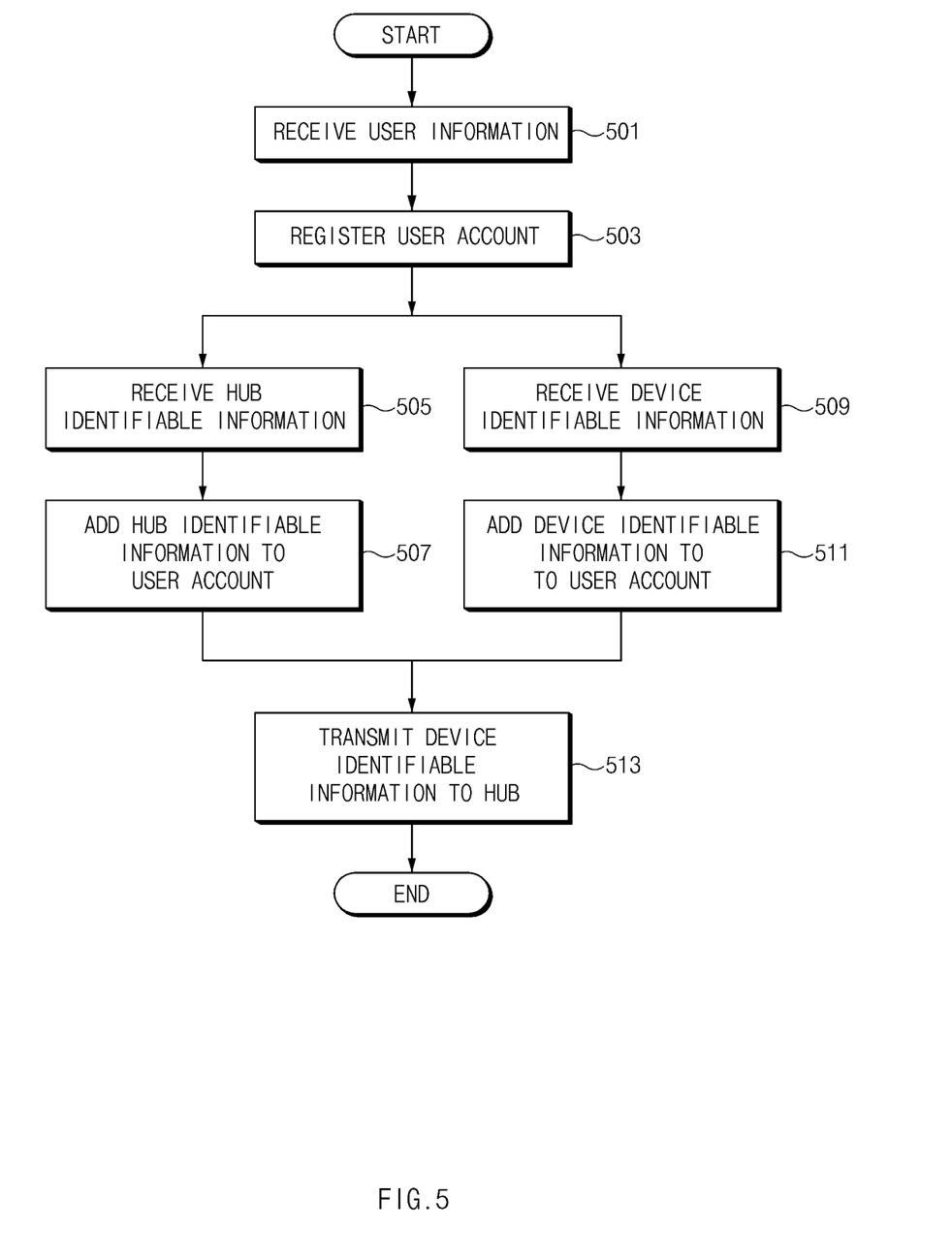
FIG. 5 illustrates an operation of a server, to which a plurality of IoT devices are connected, according to an embodiment.

FIG. 5 illustrates an operation of a server, to which a plurality of IoT devices are connected, according to an embodiment.

In step 501, the server 130 may receive user information from the electronic device 140, which may include identifiable information, such as a device serial number of the electronic device 140 or identifiable information, such as an ID, a password, or a name of the user.

In step 503, the server 130 may register a user account based on the user information received in step 501.

In step 505, the server 130 may receive hub identifiable information from the electronic device 140.

In step 507, the server 130 may add the hub identifiable information received from the electronic device 140, to the user account. The server 130 may communicate with the hub 120 corresponding to the hub identifiable information, by adding the hub identifiable information to the user account. There may be hub identifiable information added to the user account.

In step 509, the server 130 may receive device identifiable information from the electronic device 140 in several instances.

The server 130 may receive, from the electronic device 140, a request for not only the device identifiable information but also hub identifiable information registered in the user account. The server 130 may transmit the hub identifiable information added to the user account to the electronic device 140, in response to the request of the electronic device 140. When there is no hub identifiable information added to the user account, the server 130 may make a request for the hub identifiable information to the electronic device 140, in response to the request of the electronic device 140. When hub identifiable information added to the user account are present, the server 130 may make a request for the selection one of the hub identifiable information, to the electronic device 140, in response to the request of the electronic device 140.

In step 511, the server 130 may add the device identifiable information received from the electronic device 140, to the user account. The server 130 may perform the authentication of an IoT device corresponding to the device identifiable information, by adding the device identifiable information to the user account. In other words, the server 130 may authenticate that the IoT device is the user's device, such that the hub 120 is paired with the IoT device.

The server 130 may connect the received device identifiable information to at least a piece of hub identifiable information added to the user account. For example, when the hub identifiable information added to the user account includes first hub identifiable information and second hub identifiable information, the server 130 may connect the received device identifiable information to the first hub identifiable information and may not connect the received device identifiable information to the second hub identifiable information. In this case, the plurality of IoT devices 110 corresponding to the received device identifiable information may be allowed to be paired with a first hub corresponding to the first hub identifiable information and may not be allowed to be paired with a second hub corresponding to the second hub identifiable information.

In step 513, the server 130 may transmit the received device identifiable information to the hub 120 corresponding to hub identifiable information to which the device identifiable information are connected, and the hub 120 may attempt to pair the plurality of IoT devices 110 corresponding to the device identifiable information.

Steps 505 to 507 and steps 509 to 511 may be performed simultaneously, or any one of steps 505 to 507 and steps 509 to 511 may be performed first. The server 130 may be electrically connected to at least one the hub 120 through the operations and may be electrically connected to the plurality of IoT devices 110 through the hub 120.

Figure 6:
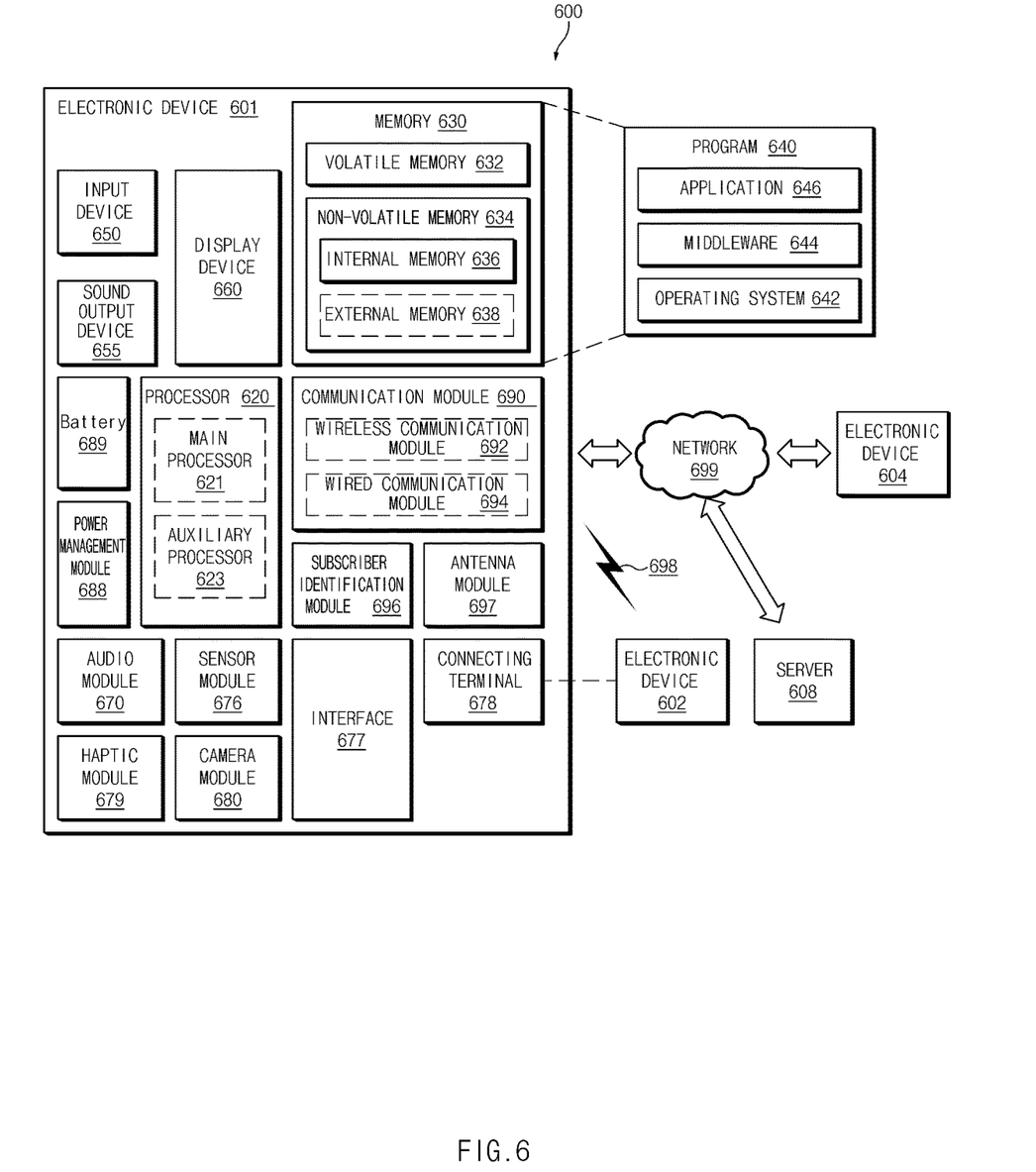
FIG. 6 is a block diagram of an electronic device in a network environment, according to various embodiments.

FIG. 6 is a block diagram illustrating an electronic device 601 in a network environment 600 according to various embodiments. Referring to FIG. 6, the electronic device 601 in the network environment 600 may communicate with an electronic device 602 via a first network 698, such as a short-range wireless communication network, or an electronic device 604 or a server 608 via a second network 699, such as a long-range wireless communication network, and may communicate with the electronic device 604 via the server 608.

The electronic device 601 may include a processor 620, memory 630, an input device 650, a sound output device 655, a display device 660, an audio module 670, a sensor module 676, an interface 677, a haptic module 679, a camera module 680, a power management module 688, a battery 689, a communication module 690, a subscriber identification module (SIM) 696, or an antenna module 697. At least one of the components may be omitted from the electronic device 601, or one or more other components may be added in the electronic device 601. Some of the components may be implemented as single integrated circuitry. For example, the sensor module 676 may be implemented as embedded in the display device 660.

The processor 620 may execute a program 640 to control at least one other hardware or software component of the electronic device 601 coupled with the processor 620, and may perform various data processing or computation. As at least part of the data processing or computation, the processor 620 may load a command or data received from another component in volatile memory 632, process the command or the data stored in the volatile memory 632, and store resulting data in non-volatile memory 634. The processor 620 may include a main processor 621, such as a central processing unit (CPU) or an application processor (AP), and an auxiliary processor 623, such as a graphics processing unit (GPU), an image signal processor (ISP), a sensor hub processor, or a communication processor (CP), that is operable independently from, or in conjunction with, the main processor 621. Additionally or alternatively, the auxiliary processor 623 may be adapted to consume less power than the main processor 621, or to be specific to a specified function, and may be implemented as separate from, or as part of the main processor 621.

The auxiliary processor 623 may control at least some of functions or states related to at least one component among the components of the electronic device 601, instead of the main processor 621 while the main processor 621 is in an inactive (e.g., sleep) state, or together with the main processor 621 while the main processor 621 is in an active state. The auxiliary processor 623 may be implemented as part of another component functionally related to the auxiliary processor 623.

The memory 630 may store various data used by at least one component of the electronic device 601. The various data may include the program 640 and input data or output data for a command related thereto. The memory 630 may include the volatile memory 632 or the non-volatile memory 634.

The program 640 may be stored in the memory 630 as software, and may include an operating system (OS) 642, middleware 644, and an application 646.

The input device 650 may receive a command or data to be used by other component of the electronic device 601, from the outside (e.g., a user) of the electronic device 601, and may include a microphone, a mouse, or a keyboard, for example.

The sound output device 655, such as a speaker or a receiver, may output sound signals to the outside of the electronic device 601. The speaker may be used for general purposes, such as playing multimedia or playing record, and the receiver may be used for an incoming calls. The receiver may be implemented as separate from, or as part of the speaker.

The display device 660 may visually provide information to the user of the electronic device 601 and may include a display, a hologram device, or a projector and control circuitry to control a corresponding one of the display, hologram device, and projector. The display device 660 may include touch circuitry adapted to detect a touch, or a pressure sensor adapted to measure the intensity of force incurred by the touch.

The audio module 670 may convert a sound into an electrical signal and vice versa. The audio module 670 may obtain the sound via the input device 650, or output the sound via the sound output device 655 or a headphone of an external electronic device 602 wiredly or wirelessly coupled with the electronic device 601.

The sensor module 676 may detect an operational state of the electronic device 601 or an environmental state external to the electronic device 601, and then generate an electrical signal or data value corresponding to the detected state. The sensor module 676 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device 602 wiredly or wirelessly. The interface 677 may include a high definition multimedia interface (HDMI), a universal serial bus (USB) interface, a secure digital (SD) card interface, or an audio interface.

A connecting terminal 678 may include a connector via which the electronic device 601 may be physically connected with the external electronic device 602 and may include an HDMI connector, a USB connector, a SD card connector, or an audio connector.

The haptic module 679 may convert an electrical signal into a vibration or a movement or electrical stimulus which may be recognized by a user via his tactile sensation or kinesthetic sensation, and may include a motor, a piezoelectric element, or an electric stimulator.

The camera module 680 may capture a still image or moving images and may include one or more lenses, image sensors, image signal processors, or flashes.

The power management module 688 may manage power supplied to the electronic device 601, and may be implemented as at least part of a power management integrated circuit (PMIC).

The battery 689 may supply power to at least one component of the electronic device 601 and may include a primary cell which is not rechargeable, a secondary cell which is rechargeable, or a fuel cell.

The communication module 690 may support establishing a wired or wireless communication channel between the electronic device 601 and the external electronic device and performing communication via the established communication channel. The communication module 690 may include one or more communication processors that are operable independently from the processor 620 and supports a wired or a wireless communication. The communication module 690 may include a wireless communication module 692, such as a cellular communication module, a short-range wireless communication module, or a global navigation satellite system (GNSS) communication module, or a wired communication module 694, such as a local area network (LAN) communication module or a power line communication (PLC) module.

A corresponding one of these communication modules may communicate with the external electronic device via the first network 698, such as a short-range communication network, such as Bluetooth®, wireless-fidelity (Wi-Fi)

direct, or infrared data association (IrDA), or the second network 699, such as a long-range communication network including a cellular network, the Internet, or a LAN or wide area network (WAN). These various types of communication modules may be implemented as a single chip or as multi chips separate from each other. The wireless communication module 692 may identify and authenticate the electronic device 601 in a communication network, such as the first network 698 or the second network 699, using subscriber information, such as an international mobile subscriber identity (IMSI) stored in the subscriber identification module 696.

The antenna module 697 may transmit or receive a signal or power to or from an external electronic device of the electronic device 601, may include one or more antennas, and, therefrom, at least one antenna appropriate for a communication scheme used in the communication network, such as the first network 698 or the second network 699, may be selected by the communication module 690. The signal or the power may then be transmitted or received between the communication module 690 and the external electronic device via the selected at least one antenna.

At least some of the above-described components may be coupled mutually and communicate signals therebetween via an inter-peripheral communication scheme, such as a bus, general purpose input and output (GPIO), serial peripheral interface (SPI), or mobile industry processor interface (MIPI)).

Commands or data may be transmitted or received between the electronic device 601 and the external electronic device 604 via the server 608 coupled with the second network 699. Each of the electronic devices 602 and 604 may be a device of a same type as, or a different type, from the electronic device 601. All or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 601. The electronic device 601 may provide the outcome, with or without further processing of the outcome, as at least part of a reply to the request. To that end, a cloud, distributed, or client-server computing technology may be used, for example.

According to embodiments, an operation of connecting a plurality of IoT devices to a server may be simplified. A user may save the time required to build a smart home, thus enhancing the user's convenience.

According to an embodiment, an electronic device includes a wireless communication circuit communicating with a server, a memory storing instructions, and at least one processor electrically connected to the wireless communication circuit and the memory. The at least one processor may execute the stored instructions to transmit user information for registering a user account in the server, to the server, to transmit hub identifiable information to the server, using the wireless communication circuit to add the hub identifiable information corresponding to a hub to the user account registered in the server, to obtain device identifiable information corresponding to a plurality of IoT devices, and to transmit the device identifiable information to the server to add the device identifiable information to the user account registered in the server. The device identifiable information added to the user account may be used such that the hub corresponding to the hub identifiable information added to the user account and the plurality of IoT devices are paired with each other.

The at least one processor may execute the stored instructions to obtain at least one serial number including the device identifiable information, from a user input and to obtain the device identifiable information, using the obtained at least one serial number.

The electronic device may include a camera. The at least one processor may execute the stored instructions to obtain an image corresponding to at least one bar code including the device identifiable information, using the camera and to obtain the device identifiable information, using the obtained image.

The plurality of IoT devices may include a type of at least one of a sensor, a TV, a refrigerator, a tablet, a notebook, an air conditioner, a washer, an electric heater, a computer, a telephone, a dryer, a vacuum cleaner, a speaker, a dishwasher, a door lock, and a surveillance camera.

The wireless communication circuit may be configured to communicate with the server, using one of a Bluetooth®, ZigBee®, wireless highway addressable remote transducer (HART), Wi-Fi, Wi-Fi direct, GSM, HSDPA, LTE, LTE-A, CDMA, CDMA2000, WiBro, OFDMA, non-orthogonal multiple access (NOMA), or new radio access technology (NRAT) communication scheme.

The electronic device may further include a display. The at least one processor may execute the stored instructions to identify the hub identifiable information added to the user account from the server and to output a specified message to the display so as to transmit the hub identifiable information to the server when the identified result indicates that there is no hub identifiable information added to the user account.

The electronic device may further include a display. The at least one processor may execute the stored instructions to identify the hub identifiable information added to the user account from the server and to output a specified message for making a request for a user input to select a piece of hub identifiable information among the hub identifiable information, to the display when the identified result indicates that there are hub identifiable information added to the user account.

The at least one processor may execute the stored instructions to transmit the piece of hub identifiable information selected based on the user input, to the server.

According to an embodiment, a server includes a wireless communication circuit communicating with an external electronic device, a memory storing instructions, and at least one processor electrically connected to the wireless communication circuit. The at least one processor may execute the stored instructions to receive user information from the external electronic device, using the wireless communication circuit, to register a user account based on the received user information, to receive hub identifiable information about a hub from the external electronic device, using the wireless communication circuit to add the hub identifiable information about the hub to the user account, to receive device identifiable information about a plurality of IoT devices from the external electronic device, using the wireless communication circuit to add the device identifiable information about the plurality of IoT devices to the user account, and to transmit the device identifiable information to the hub corresponding to the hub identifiable information added to the user account. The device identifiable information may be used such that the hub and the plurality of IoT devices are paired with each other.

The at least one processor executes the stored instructions to transmit the hub identifiable information added to the user account to the external electronic device in response to a request of the external electronic device.

The at least one processor executes the stored instructions to make a request for the hub identifiable information to the external electronic device, when the hub identifiable information added to the user account is not present.

The at least one processor executes the stored instructions to request the external electronic device to select one of the hub identifiable information, when there are hub identifiable information added to the user account.

The plurality of IoT devices may include at least one of a sensor, a TV, a refrigerator, a tablet, a notebook, an air conditioner, a washer, an electric heater, a computer, a telephone, a door lock, and a surveillance camera.

The wireless communication circuit may communicate with the hub, using a Wi-Fi, Wi-Fi direct, GSM, HSDPA, LTE, LTE-A, CDMA, a CDMA2000, or WiBro communication scheme.

The at least one processor executes the stored instructions to communicate with the plurality of IoT devices paired with the hub, using the wireless communication circuit through the hub.

According to an embodiment, a smart home system includes a hub, a server, and an electronic device communicating with the server. The electronic device may be configured to transmit user information to the server such that a user account is registered in the server, to obtain hub identifiable information corresponding to the hub, to transmit the hub identifiable information to the server such that the hub identifiable information is added to the user account, to obtain device identifiable information corresponding to a plurality of IoT devices, and to transmit the device identifiable information to the server such that the device identifiable information are added to the user account. The server may be configured to transmit the device identifiable information added to the user account to the hub, and the hub may be paired with the plurality of IoT devices corresponding to the device identifiable information transmitted from the server.

The electronic device may be configured to obtain at least one serial number including the device identifiable information, from a user input and to obtain the device identifiable information, using the obtained at least one serial number.

The electronic device may include a camera. The electronic device may be configured to obtain an image corresponding to at least one bar code including the device identifiable information, using the camera and to obtain the device identifiable information, using the obtained image.

The hub may be configured to communicate with the plurality of IoT devices corresponding to the device identifiable information transmitted from the server, through a low-power communication scheme.

The low-power communication scheme may include one communication scheme of a Bluetooth® communication scheme, a ZigBee® communication scheme, or a HART communication scheme.

As used herein, the term "module" may include a unit implemented in hardware, software, or firmware, and may interchangeably be used with other terms such as "logic," "logic block," "part," or "circuitry". A module may be a single integral component, or a minimum unit or part thereof, adapted to perform one or more functions, and may be implemented in a form of an application-specific integrated circuit (ASIC).

Embodiments as set forth herein may be implemented as software including one or more instructions that are stored in a storage medium that is readable by a machine. For example, a processor of the machine may invoke at least one of the one or more instructions stored in the storage medium, and execute it, with or without using one or more other components under the control of the processor, thus enabling the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" indicates that the storage medium is a tangible device, and does not include a signal, but this term does not differentiate between where data is semi-permanently stored in the storage medium and where the data is temporarily stored in the storage medium.

According to an embodiment, a method may be included and provided in a computer program product, which may be traded as a product between a seller and a buyer, and may be distributed in the form of a machine-readable storage medium, such as a compact disc read only memory (CD-ROM), or downloaded or uploaded online via an application store or between two user devices directly. If distributed online, at least part of the computer program product may be temporarily generated or at least temporarily stored in the machine-readable storage medium, such as memory of the manufacturer's server, a server of the application store, or a relay server.

Each component of the above-described components may include a single entity or multiple entities. One or more of the above-described components may be omitted, or one or more other components may be added. Alternatively or additionally, a plurality of components may be integrated into a single component. In such a case, the integrated component may perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

According to embodiments, an operation of connecting a plurality of IoT devices to a server may be simplified. A user may save the time required to build a smart home and the user's convenience may be enhanced. A variety of effects directly or indirectly understood through this disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. An electronic device comprising:
a display;
a wireless communication circuit configured to communicate with a server;
a memory configured to store instructions; and at least one processor electrically connected to the display, the wireless communication circuit and the memory,
wherein the at least one processor executes the stored instructions to:
transmit, to the server, user information for registering a user account in the server;
obtain hub identifiable information corresponding to a hub;
transmit the hub identifiable information to the server, using the wireless communication circuit to add the hub identifiable information corresponding to a hub to the user account registered in the server, the hub being a device that relays a connection between the electronic device and the server, and the hub identifiable information being included in a barcode corresponding to the hub;
obtain device identifiable information corresponding to a plurality of Internet of things (IoT) devices through a single barcode attached to a box including the plurality of IoT devices;
control the display to display the obtained device identifiable information corresponding to the plurality of IoT devices;
obtain a user input selecting at least one IoT device of the plurality of IoT devices after displaying the obtained device identifiable information; and
transmit first device identifiable information corresponding to the selected at least one IoT device to the server to add the first device identifiable information to the user account registered in the server,
wherein the first device identifiable information added to the user account is used such that the hub corresponding to the hub identifiable information added to the user account and the selected IoT devices corresponding to the first device identifiable information are paired with each other, and
wherein the at least one processor further executes the stored instructions to cause the electronic device to:
identify whether the hub identifiable information is added to the user account from the server;
when there is no hub identifiable information added to the user account:
  display, on the display, a message or a pop-up window that requests a user to install the hub or to transmit the hub identifiable information,
  determine whether the hub identifiable information added to the user account indicates one hub, and
  transmit the device identifiable information to the server and add the device identifiable information to the user account registered in the server when the hub identifiable information indicates the one hub, and
when there is hub identifiable information added to the user account:
  display, on the display, another message for making a request for a user input to select a piece of hub identifiable information among the hub identifiable information, and
  transmit, to the server, the piece of hub identifiable information selected based on the user input.

2. The electronic device of claim 1,
wherein the at least one processor further executes the stored instructions to:
obtain at least one barcode included in the device identifiable information, from a user input; and
obtain the device identifiable information, using the obtained at least one barcode.

3. The electronic device of claim 1, further comprising:
a camera,
wherein the at least one processor further executes the stored instructions to:
obtain an image corresponding to at least one bar code including the device identifiable information, using the camera; and
obtain the device identifiable information, using the obtained image.

4. The electronic device of claim 1,
wherein the plurality of IoT devices corresponding to the device identifiable information includes a type of at least one of a sensor, a television, a refrigerator, a tablet, a notebook, an air conditioner, a washer, an electric heater, a computer, a telephone, a dryer, a vacuum cleaner, a speaker, a dishwasher, a door lock, and a surveillance camera.

5. The electronic device of claim 1, wherein the wireless communication circuit is further configured to communicate with the server, using one of a Bluetooth®, ZigBee®, wireless highway addressable remote transducer (HART), wireless fidelity (Wi-Fi), Wi-Fi direct, global system for mobile communications (GSM), high-speed downlink packet access (HSDPA), long term evolution (LTE), LTE-advanced (LTE-A), code division multiple access (CDMA), CDMA2000, wireless broadband (WiBro), orthogonal frequency-division multiple access (OFDMA), non-orthogonal multiple access (NOMA), and new radio access technology (NRAT) communication scheme.

6. A smart home system comprising:
a hub;
a server; and
an electronic device configured to communicate with the server,
wherein the electronic device is configured to:
transmit user information to the server such that a user account is registered in the server;
obtain hub identifiable information corresponding to the hub, wherein the hub is a device that relays a connection between the electronic device and the server, and wherein the hub identifiable information is included in a barcode corresponding to the hub;
transmit the hub identifiable information to the server such that the hub identifiable information is added to the user account;
obtain device identifiable information corresponding to a plurality of Internet of things (IoT) devices through a single barcode attached to a box including the plurality of IoT devices;
display the obtained device identifiable information corresponding to the plurality of IoT devices;
obtain a user input selecting at least one IoT device of the plurality of IoT devices after displaying the obtained device identifiable information; and
transmit first device identifiable information to the server such that the first device identifiable information is added to the user account,
wherein the server is configured to
transmit the first device identifiable information added to the user account to the hub, and
wherein the hub is configured to transmit a request for pairing to a plurality of IoT devices corresponding to the first device identifiable information transmitted from the server,
wherein the first device identifiable information indicates at least one IoT device selected among the plurality of IoT devices by the electronic device, and wherein the at least one processor further executes the stored instructions to cause the electronic device to:

identify whether the hub identifiable information is added to the user account from the server;

when there is no hub identifiable information added to the user account:
- display, on the display, a message or a pop-up window that requests a user to install the hub or to transmit the hub identifiable information,
- determine whether the hub identifiable information added to the user account indicates one hub, and
- transmit the device identifiable information to the server and add the device identifiable information to the user account registered in the server when the hub identifiable information indicates the one hub, and when there is hub identifiable information added to the user account:
- display, on the display, another message for making a request for a user input to select a piece of hub identifiable information among the hub identifiable information, and
- transmit, to the server, the piece of hub identifiable information selected based on the user input.

7. The smart home system of claim 6,
wherein the electronic device is further configured to:
obtain at least one barcode including the device identifiable information, from a user input; and
obtain the device identifiable information, using the obtained at least one barcode.

8. The smart home system of claim 6,
wherein the electronic device includes a camera and is configured to:
obtain an image corresponding to at least one bar code including the device identifiable information, using the camera; and
obtain the device identifiable information, using the obtained image.

9. The smart home system of claim 6,
wherein the hub is further configured to communicate with the plurality of IoT devices corresponding to the first device identifiable information transmitted from the server, through a low-power communication scheme.

10. The smart home system of claim 9,
wherein the low-power communication scheme includes one of a Bluetooth®, ZigBee®, or wireless highway addressable remote transducer (HART) communication scheme.

* * * * *